March 10, 1931.  E. J. S. SWANSON  1,796,061

CONDUIT FITTING

Filed Aug. 7, 1926

Elmer J. S. Swanson
INVENTOR.

BY ~~~~~
ATTORNEYS.

Patented Mar. 10, 1931

1,796,061

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,805.

In the use of conduit fittings it is frequently desirable to reduce the size of the opening of the fitting so as to connect it with a smaller conduit than the opening to the fitting. The present invention is designed to accomplish this purpose with relation to fittings designed for use with threadless conduits. Examples of such fittings are illustrated in the applications of Howard A. Selah, #743,629, filed Oct. 14th, 1924 issued as Patent No. 1,597,486, dated Aug. 24, 1926, and #23,348, filed Apr. 15th, 1925, issued as Patent No. 1,683,413, dated Sept. 4, 1928.

In carrying out the invention a reducing element, or fitting is utilized. This ordinarily is a member adapted to be secured to the body of a fitting having an opening adapted to receive a securing means for a threadless conduit. As shown in said application and ordinarily also the reducing member is designed to secure a threadless conduit. The present invention, however, is not limited in its broader phases to the inclusion of both such connections, that is, between the fitting and reducer and the reducer and the securing means. Features and details of the invention will appear from the specification and claims.

The invention is illustrated in the accompanying drawings as follows:—

Figure 1:
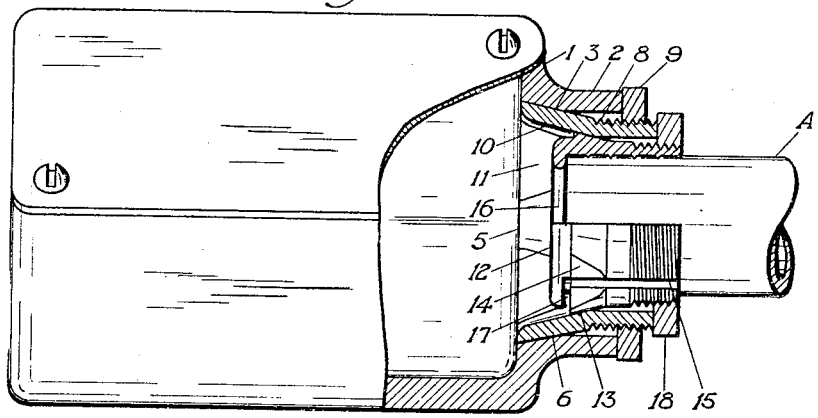
Figure 3:
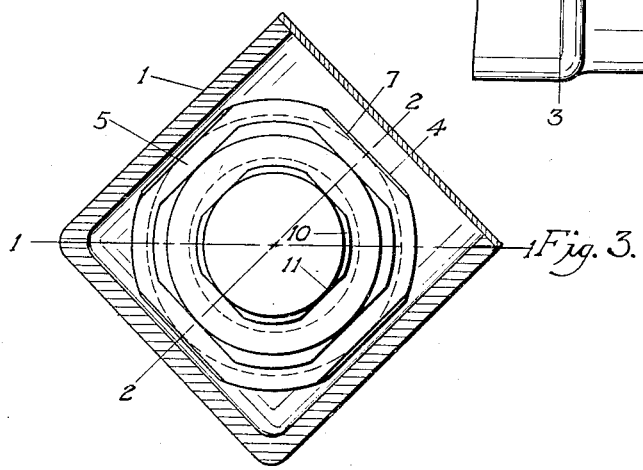

Fig. 1 shows an elevation, partly in section, on the line 1—1 in Fig. 3.

Figure 2:
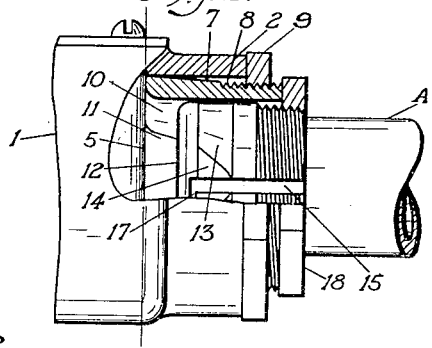

Fig. 2 an elevation, partly in section, on the line 2—2 in Fig. 3.

Fig. 3 a section on the line 3—3 in Fig. 2.

Figure 4:
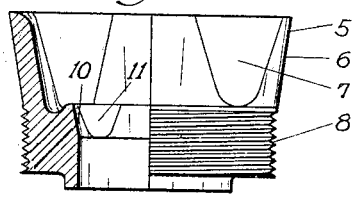

Fig. 4 an elevation, partly in section, of the reducing member.

1 marks the body of the fitting which, as shown, is in the form of a conduit box. It will be understood, however, that the invention is not limited to this particular fitting. The body of the fitting has an extension 2 with an interior tapered opening 3, and is provided with out of round portions, or flats 4.

A reducing member 5 has a tapered surface 6 adapted to contact with wedging engagement the surface 3. It is provided with flats 7 conforming to the flats 4. The member is provided with screw threads 8 and a nut 9 is arranged on these screw threads drawing the member into wedging engagement in the opening in the extension 2. The interior of the reducing member has wedging surfaces 10 and flats 11 corresponding to the wedging surfaces 3 and 4.

Arranged within the reducing member is a contractible sleeve 12. This sleeve is provided with the wedge surfaces 13 engaging the wedge surfaces 10 and with flats 14 conforming to the flats 11 preventing the sleeve from turning. The contractible sleeve has a longitudinal slot 15 and an inwardly extending guard lip 16 at its inner end. The sleeve is adapted to receive a conduit A and the guard lip 16 to guard the end of the conduit. The sleeve is provided with a circumferential slot 17 between the guard lip 16 and the body of the sleeve, thus permitting the sleeve to readily contract as the sleeve is drawn into wedging engagement with the inner surface of the reducing member. The sleeve has external threads at its outer end and a nut 18 is arranged on these threads and is adapted to draw the sleeve into the reducing member so as to contract it into clamping engagement with an inserted conduit.

It will be observed that the sleeve 12 is of a shape that if engaged would readily fit in the opening in the extension operating upon the wedged surfaces 3—in other words, the conduit fitting 1 with its extension is adapted to receive directly a contractible sleeve such as the sleeve 12 and to operate directly under these circumstances upon a larger conduit than the conduit A and the present mechanism provides a reducing member for such a fitting. Further the reducing member permits of the use of a securing means for the conduit adapted to secure a threadless conduit. Thus in the preferable form as shown the fitting is adapted to receive a securing means for a threadless conduit and the reducing member is also so adapted.

What I claim as new is:—

1. A conduit fitting comprising a body member having a conduit opening adapted to receive a threadless conduit securing means; a reducing member having an opening leading to the body opening, the reducing member opening being adapted to receive a threadless conduit securing means and having an out of round portion for locking said means against turning; and a securing means in the reducing member opening comprising a slotted sleeve having wedging surfaces adapted to engage the inner walls of the reducing member and having out of round portions in register with and engaging the out of round portions of the reducing member opening to lock the sleeve against turning, said sleeve having threads at its outer end and a nut on the sleeve.

2. A conduit fitting comprising a body member having a conduit opening adapted to receive a threadless conduit securing means; a reducing member in the opening with the contacting surfaces in wedging engagement; means forcing the reducing member endwise to force the members into wedging engagement; and means in the reducing member for securing a conduit.

3. A conduit fitting comprising a body member having a conduit opening adapted to receive a threadless conduit securing means; a reducing member in the opening with the contacting surfaces in wedging engagement; means forcing the reducing member endwise to force the members into wedging engagement, the inner end of the reducing member being the larger; and means in the reducing member for securing a conduit.

4. A conduit fitting comprising a body member having a conduit opening adapted to receive a threadless conduit securing means; a reducing member arranged in said opening with the contacting surfaces in wedging engagement, said reducing member having an opening adapted to receive the conduit securing means; means forcing the reducing member endwise to force the members into wedging engagement; a threadless conduit securing means arranged in the reducing member opening comprising a slotted sleeve in wedging engagement with the walls of the reducing member; and means for forcing the slotted sleeve endwise to contract the same.

5. A conduit fitting comprising a body member having a conduit opening adapted to receive a threadless conduit securing means; a reducing member arranged in said opening with the contacting surfaces in wedging engagement, said reducing member having an opening adapted to receive the conduit securing means; means forcing the reducing member endwise to force the members into wedging engagement; a threadless conduit securing means arranged in the reducing member opening comprising a slotted sleeve in wedging engagement with the walls of the reducing member; and means for forcing the slotted sleeve endwise to contract the same, the inner end of the contractible sleeve being the larger.

6. A conduit fitting comprising a body member having a conduit opening adapted to receive a threadless conduit securing means; a reducing member arranged in said opening with the contacting surfaces in wedging engagement, said reducing member having an opening adapted to receive the conduit securing means; means forcing the reducing member endwise to force the members into wedging engagement; a threadless conduit securing means arranged in the reducing member opening comprising a slotted sleeve in wedging engagement with the walls of the reducing member; and means for forcing the slotted sleeve endwise to contract the same, the inner ends of both the reducing member and the contractible sleeve being the larger.

7. A conduit fitting in the form of a tube having an outer wedging surface adapted for wedging engagement with the walls of an outlet opening, an inner wedging surface adapted for wedging engagement with a conduit clamping sleeve, and a screw thread at one end.

8. A conduit fitting comprising an adapter in the form of a tube having tapered wedging outer and inner surfaces, and a screw thread at one end.

9. A conduit fitting comprising a body member having a conduit opening with an out of round portion therein; a reducing member having an out of round portion adapted to engage the walls of the out of round portion of the body opening, said reducing member having an opening leading to the body opening, the reducing member opening having a portion thereof out of round and adapted to receive a threadless conduit securing means; a securing means in the reducing member opening comprising a slotted sleeve having wedging surfaces adapted to engage the inner walls of the reducing member and having out of round portions in register with and engaging the out of round portions of the opening in the reducing member to lock the sleeve against turning; and means exerting axial thrust on the sleeve.

In testimony whereof I have hereunto set my hand.

ELMER J. S. SWANSON.